United States Patent [19]

Hugl et al.

[11] 4,113,428
[45] Sep. 12, 1978

[54] PROCESS FOR DYEING FIBRE MATERIALS

[75] Inventors: Herbert Hugl; Karl Heinz Schündehütte, both of Leverkusen; Kersten Trautner, Cologne; Gerhard Wolfrum, Leverkusen, all of Germany

[73] Assignee: Bayer Aktiengesellschaft, Leverkusen, Germany

[21] Appl. No.: 813,311

[22] Filed: Jul. 6, 1977

[30] Foreign Application Priority Data

Jul. 9, 1976 [DE] Fed. Rep. of Germany ....... 2630991

[51] Int. Cl.² .................... C09B 27/00; C09B 45/48; C07C 107/06
[52] U.S. Cl. ........................................ 8/41 R; 8/41 B; 8/41 C; 8/94 A; 8/178 R; 8/179; 260/206
[58] Field of Search ................ 8/41 B, 41 R, 41 C, 8/94 A; 260/206

[56] References Cited
U.S. PATENT DOCUMENTS 3,883,503  5/1975  van Assche et al. .................. 8/41 B

FOREIGN PATENT DOCUMENTS 275,230  8/1928  United Kingdom.
1,047,026  11/1966  United Kingdom.

Primary Examiner—A. Lionel Clingman
Attorney, Agent, or Firm—Plumley and Tyner

[57] ABSTRACT

Process for dyeing hydrophobic fibre materials, preferably polyester fibres, using dyestuffs of the formula

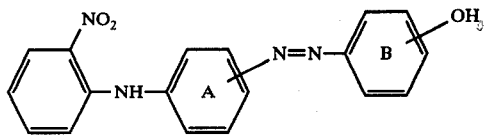

wherein
the aromatic rings A and B can be further substituted,
the azo group is in the meta-position or para-position relative to the amino group of the diphenylamine and the phenolic hydroxyl group is in the ortho-position or para-position relative to the azo group.

These dyestuffs are distinguished by high drawing power and good building up and fastness properties.

10 Claims, No Drawings

PROCESS FOR DYEING FIBRE MATERIALS

The subject of the invention is a process for dyeing hydrophobic fibre materials, which is characterised in that dyestuffs of the formula

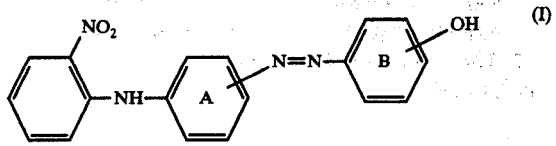

wherein
the aromatic rings A and B can be substituted by halogen, alkyl, alkoxy, cycloalkyl or aryl,
the azo group is in the meta-position or para-position relative to the amino group of the diphenylamine and the phenolic hydroxyl group is in the ortho-position or para-position relative to the azo group,
are used.

Some of the azo compounds to be used according to the invention are known; for example compounds of this type are mentioned in DOS (German Published Specification) No. 2,249,643 as intermediate products for acid dyestuffs.

Surprisingly, it has now been found that they can also excellently be used as disperse dyestuffs and in this case are distinguished by a good uptake and build-up power and by a good level of fastness properties.

In the abovementioned formula (I), alkyl preferably denotes alkyl radicals with 1–4 C. atoms which optionally can also be monosubstituted by cyano, halogen, such as chlorine, bromine or fluorine, hydroxyl or $C_1$–$C_4$-alkoxy; examples which may be mentioned are: methyl, ethyl, n-propyl, iso-propyl, n-butyl, tert.-butyl, cyanoethyl or 2-chloroethyl.

Suitable aryl is, in particular, phenyl which is optionally monosubstituted to trisubstituted by halogen, $C_1$–$C_4$-alkyl or $C_1$–$C_4$-alkoxy; phenyl, tolyl and chlorophenyl are preferred.

Suitable alkoxy is, in particular, $C_1$–$C_4$-alkoxy.

Suitable halogen is chlorine, bromine and fluorine, but preferably chlorine.

Suitable cycloalkyl is, for example, cyclopentyl, cyclohexyl and cycloheptyl.

Dyestuffs to be used particularly preferentially are those which correspond to the formula

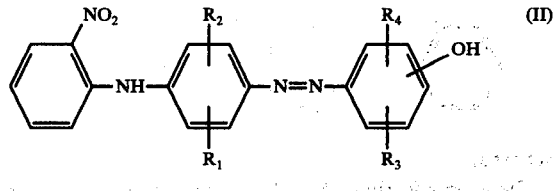

wherein
$R_1$ and $R_2$ independently of one another represent hydrogen, chlorine, methyl, ethyl, methoxy or ethoxy and
$R_3$ and $R_4$ independently of one another represent hydrogen, chlorine, methyl, ethyl, propyl, butyl, methoxy, ethoxy, cyclohexyl or phenyl and the phenolic hydroxyl group is in the ortho-position or para-position relative to the azo group.

The dyestuffs to be used according to the invention are obtained, for example, when amines of the formula

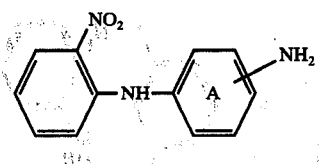

are diazotised and the diazo compounds are subjected to a coupling reaction with corresponding phenols.

Fibre materials which are preferably to be dyed are those made of cellulose triacetate and aromatic polyesters, such as, for example, polyethylene terephthalate and poly-1,4-cyclohexane-dimethylene terephthalate, as well as those made of synthetic polyamides, such as, for example, polycaprolactam, polyhexamethylenediamine adipate or polyaminoundecanoic acid. The dyestuffs can be employed in all of the dyeing processes customary for the said types of fibre, that is to say in the exhaustion process, the HT (high temperature) process and the continuous process, from aqueous and organic liquor.

EXAMPLE 1

1 part of the dyestuff of the formula

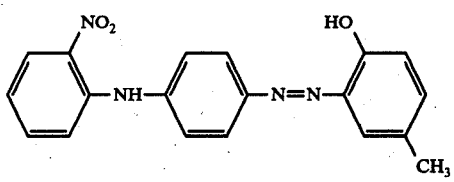

which has been finely dispersed by customary processes, is fed into 2,000 parts of water. The pH is adjusted to a value of 5 to 6 with acetic acid and 4 parts of ammonium sulphate and 2 parts of a commercially available dispersing agent based on a naphthalenesulphonic acid/formaldehyde condensation product are added. 100 parts of a polyester fabric based on polyethylene glycol terephthalate are introduced into the dye liquor thus obtained and dyeing is carried out for 1½ hours at 120°–130° C. After subsequent rinsing, reductive after-treatment with a 0.2% strength alkaline solution of sodium dithionite for 15 minutes at 60° C., rinsing and drying, a reddish-tinged yellow dyeing with good fastness properties is obtained.

EXAMPLE 2

100 parts of a fabric made of polyethylene terephthalate fibres are introduced, at room temperature, into a dyebath which has been prepared from 1 part of the dyestuff according to Example 1 and 1,000 parts of tetrachloroethylene. The bath is heated to 110° C. in the course of 20 minutes with vigorous circulation of the liquor and is kept at this temperature for 45 minutes. The liquor is then separated off and the fabric is rinsed with fresh tetrachloroethylene at 40° C. After separating off the rinsing liquor, the dyed goods are freed from adhering solvent by centrifuging and drying in a stream of air. A deep, reddish-tinged yellow dyeing with good general fastness properties is again obtained.

Similar good results are obtained when the following dyestuffs are employed and dyeing is carried out according to one of the processes mentioned:

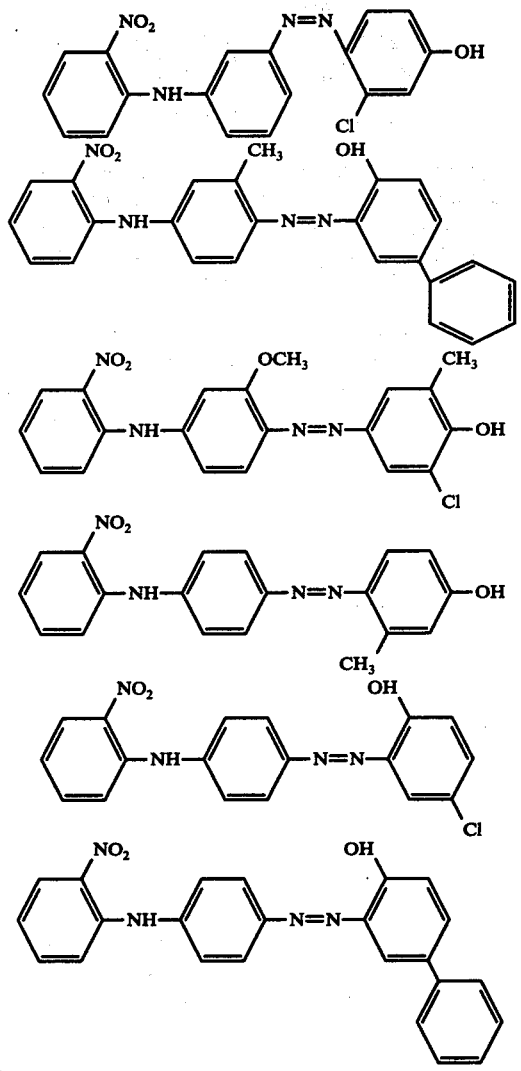

and

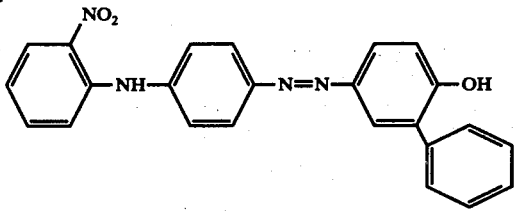

We claim:
1. A process for dyeing a hydrophobic fiber material by applying a dyestuff from an aqueous or organic liquor in which said dyestuff has the formula

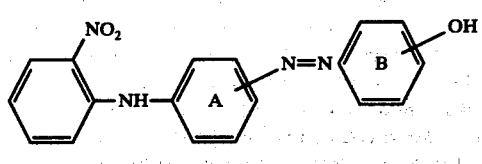

wherein
the aromatic rings A and B are unsubstituted or are substituted by halogen, alkyl, alkoxy cycloalkyl or aryl;
the azo group is in the meta-position or para-position relative to the amino group of the diphenylamine; and the phenolic hydroxyl group is in the ortho-position or para-position relative to the azo group.

2. The process of claim 1, in which said dyestuff has the formula

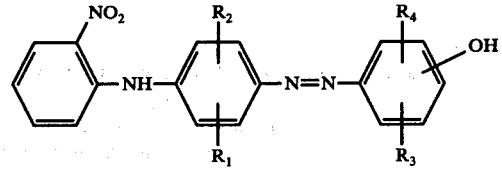

wherein
$R_1$ and $R_2$ independently of one another are hydrogen, chlorine, methyl, ethyl, methoxy or ethoxy;
$R_3$ and $R_4$ independently of one another are hydrogen, chlorine, methyl, ethyl, propyl, butyl, methoxy, ethoxy, cyclohexyl or phenyl; and the phenolic hydroxyl group is in the orthoposition or para-position relative to the azo group.

3. The process of claim 1, in which said dyestuff has the formula

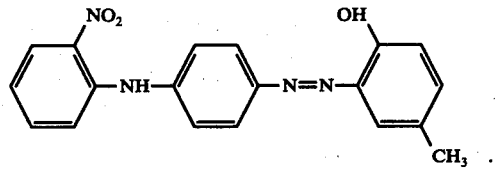

4. The process of claim 1, in which said hydrophobic fiber is made of cellulose triacetate, aromatic polyester or synthetic polyamide.

5. The process of claim 1, in which said hydrophobic fiber is made of aromatic polyester.

6. A hydrophobic fiber material dyed with a dyestuff having the formula

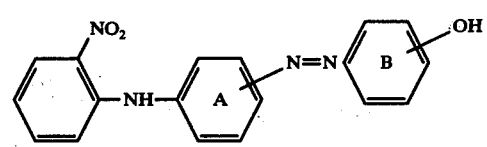

wherein
the aromatic rings A and B are unsubstituted or are substituted by halogen, alkyl, alkoxy, cycloalkyl or aryl;
the azo group is in the meta-position or para-position relative to the amino group of the diphenylamine; and the phenolic hydroxyl group is in the ortho-position or para-position relative to the azo group.

7. The hydrophobic fiber material of claim 6, in which said dyestuff has the formula

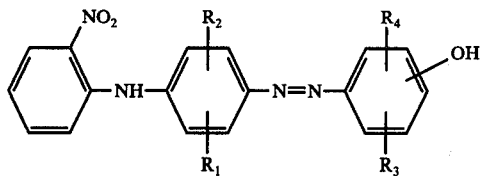

wherein
R₁ and R₂ independently of one another are hydrogen, chlorine, methyl, ethyl, methoxy or ethoxy;
R₃ and R₄ independently of one another are hydrogen, chlorine, methyl, ethyl, propyl, butyl, methoxy, ethoxy, cyclohexyl or phenyl; and the phenolic hydroxyl group is in the ortho-position or para-position relative to the azo group.

8. The hydrophobic fiber material of claim 6, in which said dyestuff has the formula

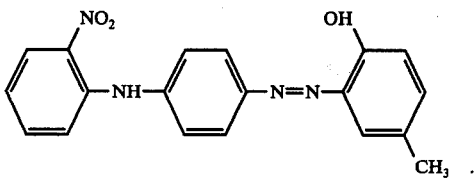

9. The dyed hydrophobic fiber material of claim 6, in which said hydrophobic fiber is made of cellulose triacetate, aromatic polyester or synthetic polyamide.

10. The dyed hydrophobic fiber material of claim 6, in which said hydrophobic fiber is made of aromatic polyester.

* * * * *